United States Patent [19]

Pigache et al.

[11] Patent Number: 4,777,370

[45] Date of Patent: Oct. 11, 1988

[54] ELECTRON GUN OPERATING BY SECONDARY EMISSION UNDER IONIC BOMBARDMENT

[75] Inventors: Daniel Pigache, Palaiseau; Francois Danel, Grenoble, both of France

[73] Assignee: Office National d'Etudes et de Recherche Aerospatiales (ONERA), Chatillon, France

[21] Appl. No.: 932,141

[22] Filed: Nov. 18, 1986

[30] Foreign Application Priority Data

Nov. 29, 1985 [FR] France ................................. 8517724

[51] Int. Cl.$^4$ ............................................. H01J 37/06
[52] U.S. Cl. ................................ 250/423 R; 250/427; 315/111.31
[58] Field of Search ............................. 250/423 R, 427; 313/231.31, 363.1, 361.1, 360.1; 315/111.21, 111.31, 111.81

[56] References Cited

U.S. PATENT DOCUMENTS

| | | | |
|---|---|---|---|
| 3,970,892 | 7/1976 | Wakalopulos | 315/111.3 |
| 4,516,848 | 5/1985 | Moriya | 355/3 CH |
| 4,642,522 | 2/1987 | Harvey et al. | 315/111.31 |

FOREIGN PATENT DOCUMENTS 2204882  5/1974  France .

OTHER PUBLICATIONS

The Journal of Vacuum Science and Technology, vol. 12, No. 6, Nov./Dec. 1975, American Institute of Physics, New York, U.S.; D. Pigache et al.: "Secondary Emission Electron Gun for High Pressure Molecular Lasers".
Review of Scientific Instruments, vol. 46, No. 9, Sep. 1985, American Institute of Physics, New York, U.S., J. R. Baylass: "Plasma-Cathode Electron Gun".

Primary Examiner—Bruce C. Anderson
Assistant Examiner—Paul A. Guss
Attorney, Agent, or Firm—Staas & Halsey

[57] ABSTRACT

The electron gun comprises an ionization chamber, adjacent to a high voltage chamber. In the wall common the both chambers provision is made for an extraction grid. On the opposite side, the ionization chamber comprises an outlet window for the electrons similar in shape to the extraction grid, and accompanied by a fine metallic foil. The high voltage chamber comprises a cathode brought to a high negative voltage. By giving the two grids the shape of similar parallel strips, a masking effect and a focusing effect are obtained at one and the same time which allows the efficiency of the electron gun to be increased.

31 Claims, 7 Drawing Sheets

FIG. 6A $V \leq 80\,kV$

FIG. 6B $V \geq 100\,kV$

ELECTRON GUN OPERATING BY SECONDARY EMISSION UNDER IONIC BOMBARDMENT

FIELD OF THE INVENTION

The present invention concerns the technical domain of electron guns, in particular high power electron guns intended especially for the treatment of materials by irradiation.

PRIOR ART

In his French Patent No. 72 38 368, published under No. 2 204 882, the applicant has proposed an electron gun which comprises, in a casing:
  an ionisation chamber, containing a gas to be ionised under low pressure, and means capable of creating positive ions from this gas and whose walls define (a) an outlet window which is transparent to the electrons and (b) on the opposite side, a conductive extraction grid at a voltage approximating to that of the outlet window; and
  a high voltage chamber which communicates with the ionisation chamber via the extraction grid and, accommodated in register with the extraction grid, a cold cathode at a high negative bias voltage in relation to the extraction grid and the outlet window.

The cathode is subjected to bombardment by ions coming from the ionisation chamber through the extraction grid, and emits secondary electrons which cross the extraction grid in the opposite direction to the ions, then traverse the ionisation chamber and finally emerge via the said window. This prior patent mainly aimed at an application of the electron gun to gas lasers with electronic excitation and also to magneto-hydrodynamic generators.

OBJECTS OF THE INVENTION

It is an object of the present invention to improve such an electron gun described above.

It is a further object of the invention to improve the efficiency of the prior art electron gun, that is to say, the ratio of the current carried by the electron beam (in the application zone) to the total current provided by the high voltage supply for the gun.

It is a still further object of the invention to make it possible to increase the acceleration voltage of the gun, that is to say, of the energy finally imparted to the electrons.

SUMMARY OF THE INVENTION

In a rather unexpected way, it has proved possible to increase the efficiency by associating with the extraction grid a mask which partly opposes the passage of the ions in the one direction and that of the electrons in the opposite direction. It is then desirable for the outlet window to comprise also a grid forming a mask constituted by the extraction grid, the similarity being understood to take the geometry of the electric field in the high voltage chamber into account. In this way, practically all of the secondary electrons created by ions which have passed through the extraction grid pass back through the grid and through the outlet window.

For many applications, it is advantageous for the surfaces of the active parts of the high voltage cathode, the extraction grid, and the grid of the outlet window to be substantially parallel, preferably also substantially planar, the lines of the electric field for their part being substantially rectilinear.

In this case, the normal projections, on the high voltage cathode, of the holes of the extraction grid and of the grid of the outlet window are substantially homothetic with respect to each other. These identical projections are substantially superposable in certain embodiments. In other embodiments, the projections relative to the grid of the outlet window are comprised in those relative to the extraction grid.

Since the secondary electrons have a low initial kinetic energy in relation to the acceleration energy but which in certain cases is sufficient for the transverse components of their velocity to lead a portion of the electrons to strike the acceleration grid, it can be advantageous to refocus the emitted electrons by giving the cathode an appropriate shape.

Nevertheless, the masking effect in accordance with the invention can also be obtained in configurations where the parallel (but possibly curvilinear) surfaces of the extraction grid and of the grid of the outlet window are inclined in relation to the high voltage cathode. The shape of these grids and the geometry of the electric field are then such that the secondary electrons can all pass back through the extraction grid and the grid of the outlet window, partly or wholly through holes different from those which were traversed by the ions.

It is advantageous to add a focusing effect to this masking effect. For this purpose, the electron gun comprises means, including the extraction grid, for focusing the ions on the high voltage cathode whilst the trajectories in the opposite direction of the high energy secondary electrons are hardly modified by the electric focusing field.

In this case, the ratio of the holes of the extraction grid approaches unity, that is to say, that this grid is, for instance, constituted by thin strips whose width direction is substantially perpendicular to the high voltage cathode.

But the ratio of the holes of the extraction grid can also be of the order of 0.5.

In a more particular embodiment, the extraction grid comprises a finely pierced screen such as a woven screen or a thin metallic sheet pierced by a multiplicity of small holes, which screen is supplemented by a mask constituted by a plate pierced by distinctly larger holes.

It is moreover possible, even when seeking the focusing effect, for the extraction grid to be constituted by a thick plate pierced by wide holes.

In the case of applications for the treatment of materials by irradiation, it can be advantageous for the general direction of the strips or other masking components existing in both the extraction grid and the outlet window to slanted in relation to the direction of feed of the material to be treated.

For its part, the grid of the outlet window can be constituted by a plate pierced by small holes and may serve as support for a very thin conductive sheet. The bars of the supporting grid can be hollow to be traversed by a coolant fluid.

It is moreover advantageous for the outlet window to comprise two similar grids placed on either side of the thin sheet which they support.

The problem of increasing the energy of the usable electrons can be solved in that provision is made, between the extraction grid and the high voltage cathode, for at least one additional electrode having an active part geometrically similar to the extraction grid, parallel to the latter and brought to a potential chosen to be between those of the extraction grid and the high voltage cathode.

Preferably the additional electrode or electrodes are pierced outside their active parts to allow gas to be pumped into the interior of the high voltage chamber.

For its part, the high voltage chamber comprises a pumping opening provided behind the cathode on the opposite side to the extraction grid and the intermediate electrode or electrodes.

In accordance with another aspect of the invention, the ionisation means comprise an anodic filament and electric power supply means for this filament comprising an elastic portion allowing its elongation to be compensated. In certain embodiments, the ionisation means also comprise a secondary starting filament.

In accordance with yet another aspect of the invention, the cathode is preferably supported by an insulating tube whose internal conduit houses the high voltage power supply line as well as the coolant liquid which returns via a conduit formed in this insulating tube.

For their part, the extraction grid and the grid supporting the outlet window are advantageously defined in large components suitable for the circulation of a coolant fluid.

BRIEF DESCRIPTION OF THE DRAWINGS

Other characteristics and advantages of the invention will become apparent on examining the following detailed description and of the attached drawings, wherein.

DESCRIPTION OF THE PREFERRED EMBODIMENTS

The shapes and geometry intervene in the present invention in many respects. The attached drawings shall therefore be considered as an integral part of the present description and they can, if required, contribute to the definition of the invention.

Figure 1:
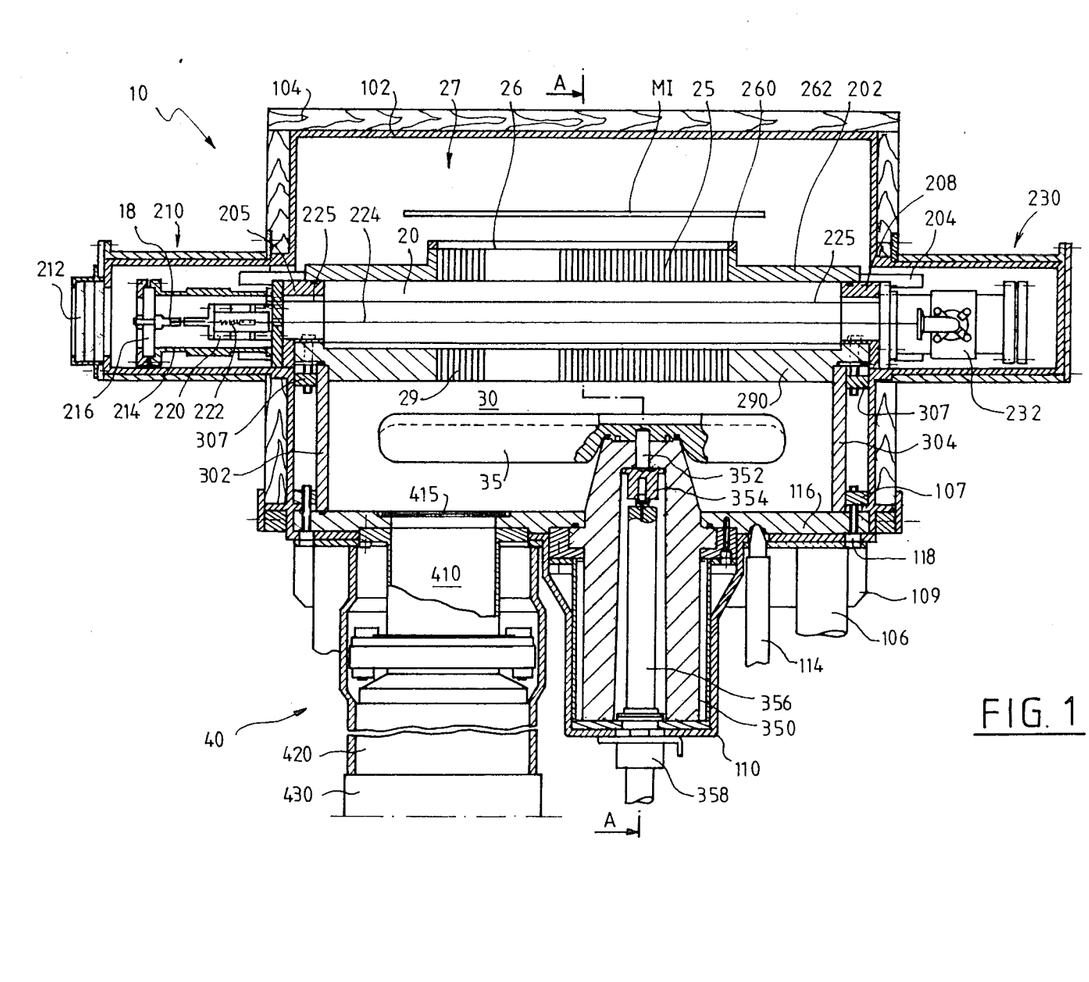
FIG. 1 is a vertical longitudinal cross-sectional view of a particular first embodiment of the electron gun in accordance with the invention.
Figure 2:
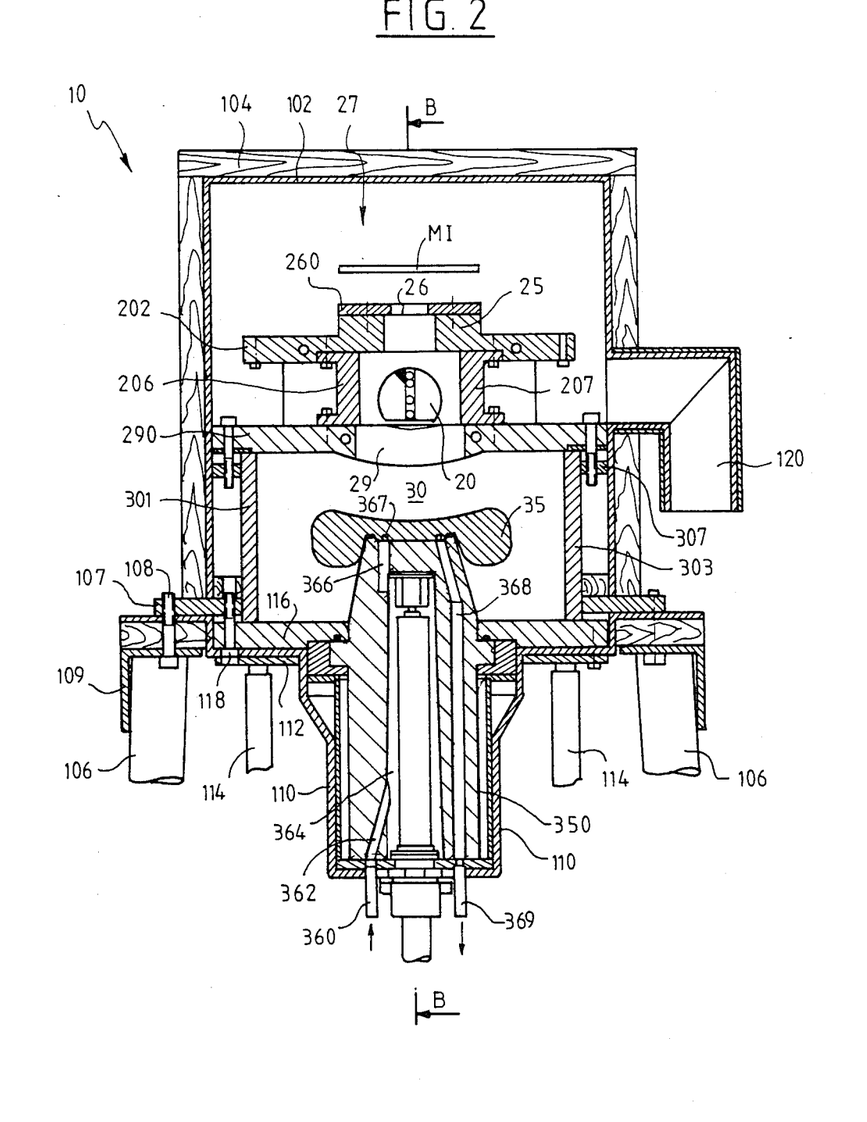
FIG. 2 is a cross-section along AA in the transverse plane of FIG. 1.

Reference is now made to FIGS. 1 and 2 for describing a first embodiment of the invention which will be explained in detail.

The electron gun is contained in a casing 10 defined by a lead wall 102, opaque to the x-rays generated by the electron beam, and lined by a plywood shell 104. The unit is supported by four legs 106 fixed in pairs to horizontal angle irons 109. The angle irons 109 support, by means of a plywood shell, a lower lead cap 110 which in its turn supports the base plate 107 of the casing 10. Fixing is ensured by screws 108 (FIG. 2) between the angle irons 109 and the base plate 107.

The rest of casing 10 has the general shape of a cloche placed on the base plate 107.

At the bottom, the cap 110 serves for accommodating the various elements supporting the cathode as well as for the connection of the pumping means as will be seen below. Jacks 114 support the various components associated with the cathode, relative to the internal bottom 116. Moreover, screws 118 support this bottom with respect to the base plate 107. On the outside, the cap 110 is also supported by a plate 112 provided with means for screwing to the plate 116.

Laterally the casing 10 is provided with a wide tube 120 for the entry of the electric cables, and the lines for the helium and the coolant fluid.

It should now be mentioned that provision is made for many seals inside the ionisation and high voltage chambers. They will not be described in detail, since the expert will be able to recognise them in the drawings.

This shall also apply to the coolant fluid circuits, only a part which will be described.

An ionisation chamber 20 defined within the casing 10 is delimited by a top 202 whose central portion is in the form of a supporting grid 25. Provision is made for circulation ducts 204 of a coolant fluid for the grid. The chamber 20 moreover comprises long lateral walls 206 and 207 as well as lateral end walls 205 and 208. The shape of this chamber 20 in a horizontal cross-section is substantially rectangular.

Opposite the small walls of this chamber, the casing 10 comprises a left hand lateral extension 210 (FIG. 1) provided with a window 212 and right hand lateral extension 230.

In addition to its observation function by means of the window 212, the extension 210 accommodates internally a wide closed sleeve 214. The end 216 of this sleeve 214 transparent and supports at 18 an electric terminal which is supported by two insulating studs 220. These studs 220 carry a spring assembly 222 for energising an anode wire 224 which over its length completely traverses the ionisation chamber 20. In accordance with an advantageous characteristic of the invention, the wire 224 is caused to remain stretched in spite of its elongation which will result from its being heated in use. Preferably, provision is also made, in the ionisation chamber 20, for a starting wire 225 which is parallel to the wire 224 and whose power supply is not illustrated in detail.

On the opposite side, the lateral extension 230 comprises a helium duct 232.

Finally, the bottom portion of the ionisation chamber 20 is closed by a component 290 whose central portion defines an extraction grid 29.

Functionally, the most important components of the electron gun, as far as the present invention is concerned, will be the extraction grid 29, the supporting grid for the electron window 25, and the thin metallic foil 26 which forms an electron window and is constricted by means of the component 260.

The material MI to be irradiated moves along above the metallic foil 26.

Below the ionisation chamber 20 is a high voltage chamber 30 the top of which is defined by the component 290. Laterally, the high voltage chamber 30 is delimited by walls 301 and 303 in one direction and 302 and 304 in the other. These walls are brazed to the bottom plate 107 on the one hand and to a top plate 307 on the other hand.

As indicated above, the high voltage chamber 30 is closed at its bottom by the plate 116; this plate comprises an opening 415 facing pumping means generally designated 40. Advantageously provision is made, first of all, at 410 for a transition zone enabling measurement of the pressures obtaining in the high voltage chamber 30. Then the device 40 comprises a connection 420 to the pump 430 which is preferably a turbo-molecular vacuum pump.

The base plate 116 is also pierced to receive a tube 350 which forms an insulator and at the same time a support for the cathode 35 in the high voltage chamber 30. The tube 350 has an axial bore accommodating an insulated conductor 356 having an external connection 358 and leading to component 354, which is also conductive and feeds a pin 352 traversing the upper covering of the insulator 350 to feed the cathode 35.

This cathode 35 is oblong in shape and has an upper portion which has a concave transverse cross-section, as shown in FIG. 2.

The insulator 350 is moreover provided with a coolant inlet line 360 (FIG. 2) which is formed by a tube embedded into the insulator itself to communicate with the interior of the tube. In the upper portion, the coolant fluid path follows a tube 366 communicating with an annular refrigerant passage 367. At the other end, the refrigerant passage leads into a tube 368 integrated into the wall itself of the insulator 350 and issuing at 369 into the return conduit for the refrigerant.

It will have been observed that FIG. 1 is a view along the section line B—B of FIG. 2; conversely, FIG. 2 is a view along the section line A—A of FIG. 1, which section line is broken to pass, on the one hand, along the plane of symmetry of the grids 25 and 29 and, on the other hand, along the axis of the insulator 350.

The operation of the electron gun may be summed up as follows: the ionisation chamber 20 and the high voltage chamber 30 both contain a gas at very low pressure, capable of positive ionisation; in this case the gas is helium at 10 to 50 mTorr. These two chamber communicate via the extraction grid 29. The walls of the ionisation chamber 20 and of the high voltage chamber 30 are at earth potential. This is also the case with the extraction grid 29 itself, although the grid 29 may if desired be at a slightly different potential.

The ionisation chamber contains electrons necessary for establishing an electric discharge. In general, small potential differences between the discharge electrodes are sufficient to obtain the ionisation. It is usual to make provision for voltages from 500 to 1000 volts in continuous working, or 10 to 20 kilovolts in pulsed operations.

Figure 3A:
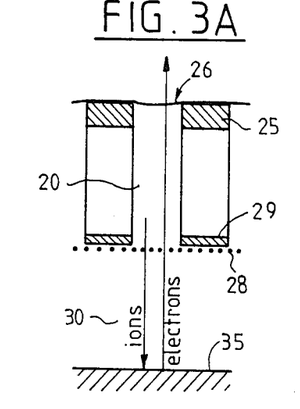
FIGS. 3A and 3B are diagrams illustrating the masking effect in accordance with the invention.

A proportion of the ions created by the discharge is accelerated towards the high voltage cathode 35, passing through the extraction grid 29. The ions strike the high voltage cathode 35 (FIG. 3A). The high voltage cathode is permanently maintained at a high nagative bias voltage designated $V_{HT}$ which is for example $-200$ kilovolts.

If the initial energy of the ions in the vicinity of the extraction grid 29 is neglected, the electrons can be considered as arriving at the cathode 35 with an energy equal to $e.V_{HT}$ (bearing in mind that one is concerned with single charge ions). The electrons resulting from the secondary emission on the surface of the cathode 35 are in their turn accelerated towards the extraction grid 29, which they reach with an energy of $e.V_{HT}$. They then pass through the ionisation chamber 20 to reach the outlet window 26.

It is preferable, but not indispensable, for the surfaces of the cathode 35 and of the extraction grid 29 which face each other to have a shape such that the lines of the electric field in the space separating them should be approximately rectilinear and normal to these two surfaces.

As a result, these two surfaces can, for example be planar and parallel, or cylindrical and coaxial, or even spherical and concentric. In the two latter cases, the opening angle of the beam can be large and can even attain 360° in the case of a coaxial cylindrical electron gun.

Figure 3B:
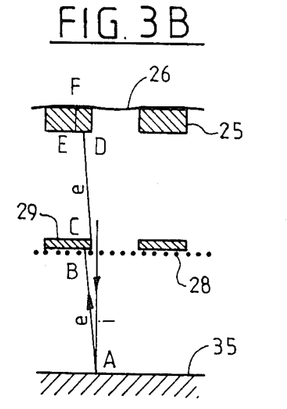

It will be observed that, in FIGS. 3A and 3B, the extraction grid 29 is associated with a fine meshed grid 28 which (a) ensures the above mentioned condition for the lines of the electric field, that is to say they are rectilinear and perpendicular to the surfaces defined by the find grid 28 as well as to the plane face 35 of the cathode, and (b) reduces the penetration of the electric potential into the ionisation chamber.

Under these conditions, one ion and the electrons emitted by it, have trajectories which are approximately superposed corresponding to one and the same field line.

However, the applicant has observed in practice that there exists a transverse component of the electric field mainly in the vicinity of the extraction grid 29. This entails a slight deviation of the trajectories. The small transverse components of the initial velocities of both the ions and electrons add an additional deviation.

Thus (FIG. 3B), a proportion of the electrons arriving at the level of the extraction grid traverses firstly the grid, and then, in a straight line, the ionisation chamber (which is a quasi-equipotential space), then finally, the electron window which separates the electron gun from the application zone whose pressure is generally high (of the order of atmospheric pressure) irrespective of the application envisaged.

The extraction grid 29 is indispensable because it forms an electrostatic screen between the ionisation chamber and the high voltage chamber wherein there obtains a very intense electric field of the order of some tens of kilovolts per centimeter. This screen makes it possible to produce uniform ionisation of the required strength in the ionisation chamber irrespective of the potential applied to the high voltage cathode of the electron gun.

The electron window consists of a rather thin sheet 26 which is transparent to high energy electrons ($e.V_{HT}$ where $V_{HT}$ is the potential at the cathode). This sheet can be made of a metal such as aluminium or titanium and have a thickness of a few tens of micrometers.

It has been observed that many applications, in particular those relating to the treatment of materials by irradiation, require a window width exceeding one centimeter. It has then been found that it is indispensable to have a supporting grid 25 under the thin window sheet 26 so that the sheet can withstand the pressure.

The experiments carried out by the applicant have shown that the efficiency of an electron gun with secondary emissions depends in particular on (i) the transparency of the extraction grid 29 (to the ions on the one hand, and the electrons on the other hand), and on (ii) the transparency of the assembly of the electron window and its support to the electrons.

In the known embodiments, the extraction grid is generally a woven metallic grid whose transparency cannot exceed approximately 70%.

For its part, the supporting grid for the electron window can be constituted by thick stretched wires permitting a transparency of up to 90%. However, in practice, when the gun is operating at full power and with a large window width (some centimeters or more), the transparency does not exceed 70% because it is necessary to remove by thermal conduction (or by fluid circulation) the energy expended by the electron beam on passing through the thin sheet and also by direct impact on the supporting grid for the sheet.

It follows from this that the product of the two transparencies is of the order of 0.5.

The present invention will contribute a particular arrangement of the unit of the extraction grid and the supporting grid for the electron window, which permits firstly an increase in the efficiency of the gun, and secondly an increase in the accelerating voltage of the gun, by means of twin-stage or multi-stage assemblies, and does so without loss of efficiency.

FIGS. 3A and 3B will now facilitate the description of the masking effect.

In the known configuration of electron guns with secondary emission, the stream of electrons is emitted almost uniformly by the high voltage cathode. During the return, a proportion of the electron stream is then intercepted by the extraction grid, in relation to the transparency of the grid.

By interposing a mask 29 in the vacinity of the extraction grid (FIG. 3A), this mask blocks the extraction of the ions in its shielding portions. The ions which are, on the contrary, extracted at the surface of the holes of the mask facing towards the high voltage chamber 30, produce the emission of the secondary electrons in the vicinity of the cathode 35. These electrons then pass back through the same holes of the mask 29, their trajectories being approximately superposed on those of the ions which have produced them.

Placing the supporting grid 25 for the electron window 26 exactly in register with the holes of the mask, it is apparent that the electrons passing through the extraction grid 29 in the region of the mask holes also pass through the holes of the supporting grid 25. All then happens as though the supporting grid were perfectly transparent.

In practice, the mask 29 may be placed either above or below the extraction grid 28.

However, it has been observed that there subsists a transverse component of the initial velocity of the secondary electrons to which there is added the transverse component of the electric field near the extraction grid. Micro-roughnesses subsist in spite of the polishing required for the purpose of maintaining the voltage. As a result, the ions emitted at the edge of the mask 29, and arriving at A (FIG. 3B) emit electrons striking the shielding portions of the mask at B. The effective transparency of the extraction grid 28 provided with a mask 29 is therefore slightly lower than its theoretical value.

Moreover, in the interior of the ionisation chamber, the electron trajectories are practically rectilinear but the small transverse component of the velocity of the electrons may lead some of the electrons which have passed through the mask 29 to strike the shielding portions of the supporting grid 25. In FIG. 3B, an example of such an extreme trajectory is seen at CD.

In this latter case, it suffices to make the holes in the supporting grid 25 a little larger, for example as far as shown at EF in FIG. 3B, for the effective transparency of the grid 25 with regard to the electrons to remain approximately equal to 100%.

The opening of the supporting grid 25 for the electron window is obviously limited by the minimum thickness of the material ensuring its robustness and its cooling. The same result is obtained with smaller openings of the supporting grid subject to reducing as far as possible the distance separating the grids 25 and 29 delimiting the thickness of the ionisation chamber. The usual thickness of the ionisation chamber is of the order of 4 to 10 cm. It has been possible to reduce this thickness to from 1 to 2 cm in a large size ionisation chamber (length 50 cm., width 9 cm.) and to provide uniform, continuous and intense ionisation (a charging current of 20 to 60 mA) and at a rather low pressure (10 to 40 mTorr of helium), to be compatible with the use of this chamber in a secondary emission gun in accordance with the invention.

The masking effect which has just been described is in itself sufficient to confer a high degree of efficiency on the electron gun in accordance with the invention. However, it is advantageous, at least for certain applications, to use also the focusing effect which will now be described. This focusing effect uses to good advantage the transverse component of the electric field which was seen above to have an adverse influence in the case of the masking effect.

Figure 4A:
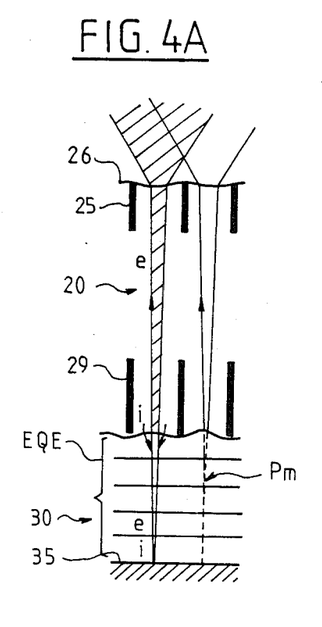
FIGS. 4A and 4B are diagrams illustrating the focusing effect in accordance with the invention.

FIG. 4A shows an extraction grid 29 constituted by regularly interspaced strips which are parallel to each other and perpendicular to the surface of the cathode 35. It corresponds to the embodiment of FIGS. 1 and 2.

The approximate shape of the equipotential lines in the high voltage chamber 30 has been represented at EQE. The applicant has observed that in this configuration, the equipotential lines assume a concave shape near the extraction grid 29, and between each strip of that grid.

In operation, this configuration corresponds to an electrostatic lens (cylindrical in the example illustrated) which produces the convergence of the trajectories of the ions (i) as represented very schematically in FIG. 4A.

Thus the ions converge towards a narrow zone of the high voltage cathode 35 which zone is situated symmetrically in relation to the intersection of the median plane Pm of two successive strips and the surface of the high voltage cathode 35.

Since all the electrons (beam e) are emitted in these convergent zones, the electron beam is composed of curtains which are only seen in cross-section in the cross-sectional view of FIG. 4A. These beams are slightly defocused on passing through the extraction grid 29.

As in the case of the masking effect, the strips forming the supporting grid 25 are placed opposite those of the extraction grid 29. The electron bean then passes through the thin sheet 26 in zones whose width is clearly smaller than the gap between two strips of the supporting grid 25, as is shown in FIG. 4A.

It should also be noted that the focusing effect of the ions, whose energy is very low when they reach the extraction grid 29, is clearly much greater than the defocusing effect sustained by the electrons, because their energy is, on the contrary, very high (e.$V_{HT}$) at this point.

Whilst the masking effect only made it possible to bring the transparency of the supporting grid 25 for the electrons close to 100%, it becomes clear that the additional focusing effect also allows the transparency of the extraction grid 29 to be brought to 100%. This naturally leads to an additional improvement in the efficiency of the electron gun.

Figure 5A:
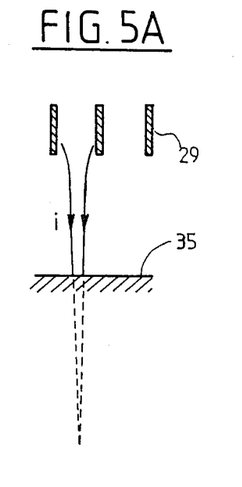
FIGS. 5A and 5B are diagrams illustrating an insufficient and excessive focusing respectively.
Figure 5B:
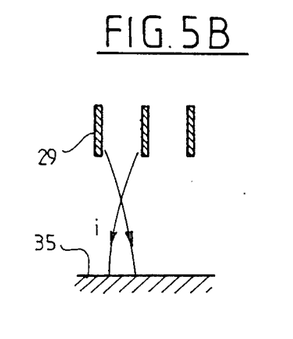

Inadequate focusing (FIG. 5A) when the focus of the ion trajectories is far beyond the cathode 35 must, of course, be avoided as must, on the contrary, excessive focusing (FIG. 5B) bringing this same focus upstream from the cathode 35.

Figure 4B:
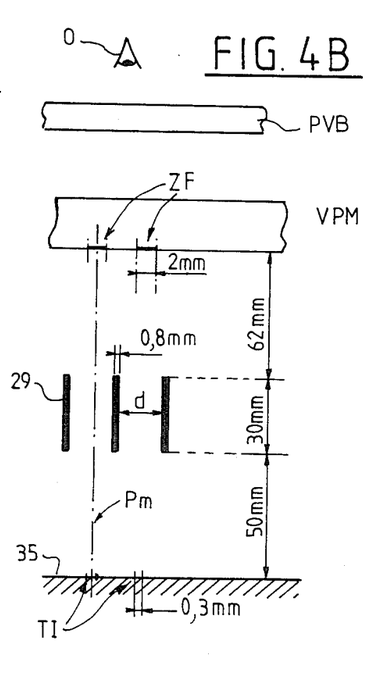

It proved possible to demonstrate the focusing effect experimentally with the assembly illustrated in FIG. 4B.

The electron window (the supporting grid 25 and the thin sheet 26) is replaced by a plate VPM of Pyrex glass (trade mark) provided with a metallised layer on the side facing the ionisation chamber 20. It then becomes possible to observe the light emitted by the electric discharge in the ionisation chamber through this plate when the electron gun is operating. One also observes the fluorescence induced by the impact of the electron beam inside the Pyrex glass, in the thin layer penetrated by the beam.

The observer O (or the photographic film) are protected from X-ray radiation by a leaded glass plate PVB of sufficient thickness. For this purpose, an observation window is arranged in the casing 10.

The luminous intensities of the two effects are of the same order of magnitude, but their colours are very different because the fluorescence of the beam manifests itself as blue, whilst the discharge is manifested in yellow-red. The use of a metallised Pyrex glass plate VPM (500 angstroms of aluminium) makes it possible to block out the light admitted by the discharge while it is easily traversed by the electron beam when the energy of the beam is sufficient.

It should also be noted that although FIG. 4B is not drawn to scale it comprises dimension indications expressed in millimeters.

With the gap d between the strips assuming the values of 4, 6, 8 and 12 mm, then when the electron gun is in operation the fluorescence induced by the electron beam in the Pyrex plate VPM will be observed.

Figure 6A:
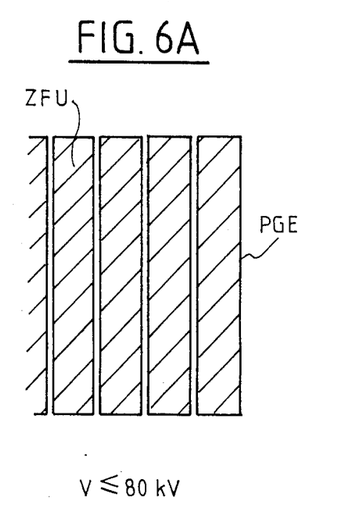
FIGS. 6A and 6B are diagrams illustrating the implementation of the focusing effect on the basis of an experimental assembly defined with reference to FIG. 4B.

The fluorescence is visible starting with a voltage of the order of $-10$ kilovolts applied to the cathode 35 (FIG. 6A). The fluorescence rapidly increases with increasing cathode voltage $V_{HT}$, and it is relatively uniform as illustrated at ZFU, whilst the contours PGE designate the projection of the rectangular openings of the extraction grid on the Pyrex plate VPM.

When $V_{HT}$ reaches values of from 80 to 100 kilovolts, a concentration of the fluorescence will be observed. As from 100 kilovolts, the fluorescence is concentrated in a 2 to 3 mm wide band with d=4 and 6 mm, and has widths from 3 to 4 mm with d=8 and 12 mm, as may be seen in FIG. 6B, where l designates the width of this band.

Figure 6B:
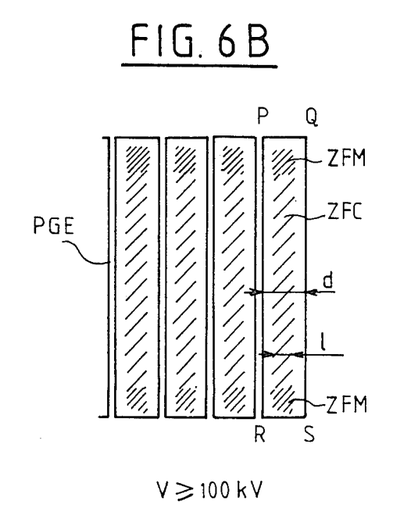

No change is observed between 100 and 150 kilovolts but the intensity of the fluorescence continues to increase with increasing voltage.

Outside this concentration zone of width l, a uniform fluorescence of much lower intensity subsists, which implies that if the Pyrex plate were to be replaced by the supporting grid for the electron window in accordance with FIG. 4A, the transparency of this grid would, in fact, be slightly below 100%.

Moreover, the fluorescence zones are somewhat shorter than the rectangular openings of the extraction grid (in cross-section). A local intensification ZFM of the luminous intensity will, moreover, be observed at the two ends of each intense fluorescent zone ZFC. This intensification can be explained by the fact that the focusing of the beam at the ends is not only effected along the sides PR and QS as in the central zone, but also along the sides PQ and RS (FIG. 6B).

The same phenomenon is observed irrespective as to whether the electron gun is operating on a continuous basis or a pulsed basis. It is substantially independent of the density of the instantaneous current of the electron beam within the limits of values comprised between 30 microamperes per square centimeter and 60 milliamperes per square centimeter. On the other hand, the intensity of the fluorescence does increase with the mean current density of the beam.

On dismantling the electron gun, traces of ion impact could be found on the cathode 35 (FIG. 4B) which are reflected in a brown coloration on a stainless steel surface which had originally been polished. The width of these traces is of the order of 0.3 to 0.5 mm. Their length is identical with that of the fluroescence zones ZFC on the Pyrex plate. These traces are situated at the intersection of the median planes Pm between two successive strips with the working suface of the cathode 35.

These observations which apply to the embodiment of FIGS. 1 and 2, corroborate the indications given above with reference to the masking and focusing effects.

If the masking effect is sought on its own, the openings of the extraction grid 29 can, in principle, be of any shape chosen in accordance with the application.

The focusing effect, which presupposes a minimum masking effect, has been observed in the case of a grid constituted by parallel thin strips.

It is considered that this effect can also be obtained with an extraction grid constituted by thick parallel strips or a rather thick plate pierced by cylindrical or conical holes. In this latter case, the ions will be focused on a circular zone whose centre is the intersection of the hole axis with the surface of the high voltage cathode 35. The supporting grid 25 for the electron window must of course be pierced by holes having the same axis as those of the extraction grid.

On the basis of the above observations, the applicant has found that, in certain cases, it may be difficult to optimise the focusing effect because for this purpose it is only possible to take action regarding the shape of the holes and the thickness of the extraction grid 29 in relation to the dimension of the holes.

Figure 7:
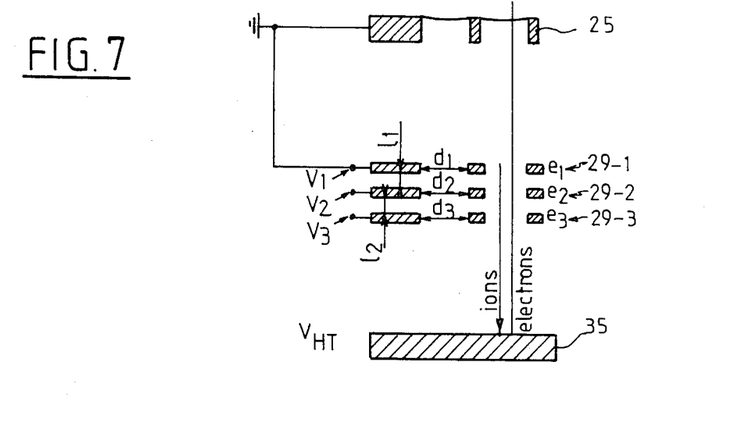
FIG. 7 is the diagram showing the principle of a device with multiple extraction grids, that is to say, with auxiliary extraction electrodes in accordance with the invention.

To obtain such an optimisation, it may be advantageous to replace the single extraction grid by a system of two or three extraction grids, such as 29-1, 29-2 and 29-3 (FIG. 7). The thicknesses of these grids are respectively e1, e2, e3, their hole dimensions d1, d2, d3, their separations l1 and l2, and their respective polarisation voltages V1, V2, V3. All of these parameters are then variable for optimising the focusing effect, especially in accordance with the desired shape of the mask.

The practical consequences of the masking and focusing effects in accordance with the invention will now be summed up.

The increase in efficiency of the gun is accompanied by a reduction in the thermo-mechanical stresses to which the grids are subjected. The heat to be evacuated by the supporting grid 25 is now reduced to the energy deposited in the thin sheet 26. The heat to be evacuated via the extraction grid 29 is zero in the case where the focusing effect is used; in the case where one is content with the masking effect, it is unchanged for a given beam flow, but it can more easily be dissipated because it is distributed over a larger thermally conducting metal surface.

Moreover, as it is possible to increase the thickness of the strips or bars constituting the grids, without changing the overall transparency and hence the efficiency, the costs of machining the grids can be reduced, since it is, for instance, possible to replace electroerosion by a conventional milling operation. The thermal dissipation can also be facilitated by thermal conduction or by the passing of a coolant fluid.

An even more convenient manufacture is obtained with the use of grids constituted by a plate pierced by round holes, cylindrical or conical for example, with the comment that in that case the heat evacuation is somewhat less favourable.

Figure 8A:
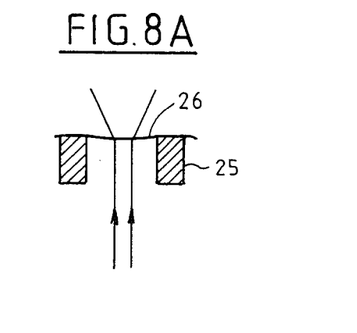
FIGS. 8A and 8B are diagrams illustrating certain aspects of the embodiment of the outlet window.
Figure 8B:
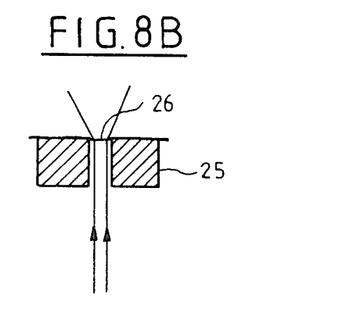

A comparison of FIGS. 8A and 8B shows, moreover, that the (horizontal) thickness of the bars of the supporting grid 25 may be increased without changing the pitch of the grid. The result is a reduction in the span of the thin sheet 26 which increases its robustness and/or permits a reduction in its thickness. The result is an increase in its own transparency and the energy available for the emerging electron beam approaches its maximum value of $e.V_{HT}$.

Figure 9:
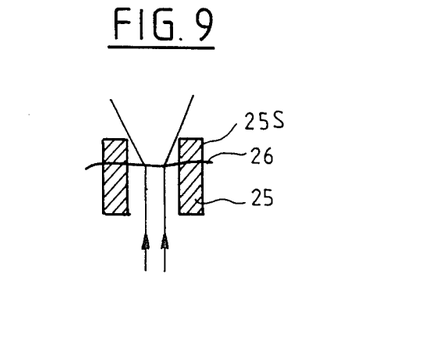
FIG. 9 is a diagram illustrating a variant of the embodiment of the outlet window.

As FIG. 9 shows, the heat dissipation can also be intensified without loss in the electron beam by placing additional bars such as 25S on the other side of the thin sheet 26.

At the application zone the electron beam takes the form of low thickness curtains which are clearly separated from each other. This phenomenon is substantially attenuated on the one hand because of the dispersion of the electron beam in the thin sheet 26, and on the other hand because of the dispersion also occurring in the gas situated between this thin sheet 26 and the product to be treated. This dispersion produces overlapping of the beams as seen in FIG. 4A.

Figure 10:
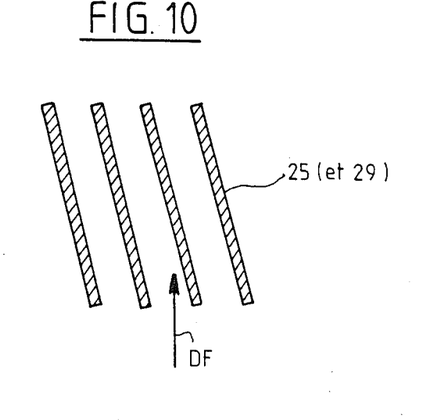
FIG. 10 is a diagram illustrating an application of a device in accordance with the invention to the irradiation treatment of a moving material.

The uniformity of the irradiation dose may still be inadequate for certain applications. It is then possible, as illustrated in FIG. 10, to orient the strips constituting grids 25 and 29 in a slanting manner in relation to the feed direction DF of the product to be treated, so that every surface element of this product moves across at least one curtain of electrons. It suffices for this purpose for the distance between the two ends of one and the same grid strip, measured perpendicular to the direction DF, to be at least equal to the pitch between two adjacent grid strips.

In the embodiments described so far it has been assumed that the lines of the electric field are substantially normal to the surface of the cathode 35. This condition is not obligatory.

First of all a slight departure from this condition of perpendicularity (a deviation of a few degrees for example) is acceptable if the electron beams are fairly well collimated for all the electrons to pass nevertheless through the same holes as the ions which have emitted them.

Figure 11:
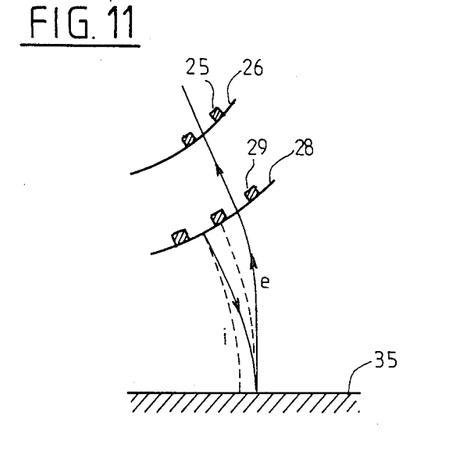
FIG. 11 is a diagram illustrating another variant of the first embodiment of the invention.

Moreover, it is not necessary for the electrons to pass back through the same holes of the extraction grid as the ions which have produced their emission, as long as they can pass through other holes without being intercepted by the extraction grid. This is illustrated in FIG. 11, where it will be seen that the beam of ions i passes through one hole of the extraction grid 29, whilst the secondary electrons deriving from them pass through the adjacent hole of this same grid. It will also be noted that the electric field lines are oblique in relation to the active surface of the cathode 35. It is then easy to align the holes of the extraction grid 29 and of the supporting grid 25 for the electron window 26 because the space between these two grids is quasi-equipotential and the electron trajectories are then practically rectilinear, as illustrated.

The description given so far has concerned the details of an embodiment of the invention described in detail with reference to FIGS. 1 and 2. This embodiment also corresponds to FIGS. 4A, 4B, 6A and 6B.

It is considered to be within the grasp of the expert to modify the structure illustrated in detail in FIGS. 1 and 2 to correspond to the masking effect on its own, as schematically illustrated in FIGS. 3A and 3B.

Similarly the embodiment illustrated in detail can also be adapted in accordance with the teachings of FIGS. 7, 8A, 9, 10 and 11.

An embodiment will now be described wherein the high voltage chamber is a multi-stage one. For the same reason as above, and with the aim of facilitating the description, this embodiment will be described schematically with reference to FIG. 12. It is considered that the detailed teachings given in the first two Figures will enable the expert to make this variant of the invention.

Figure 12:
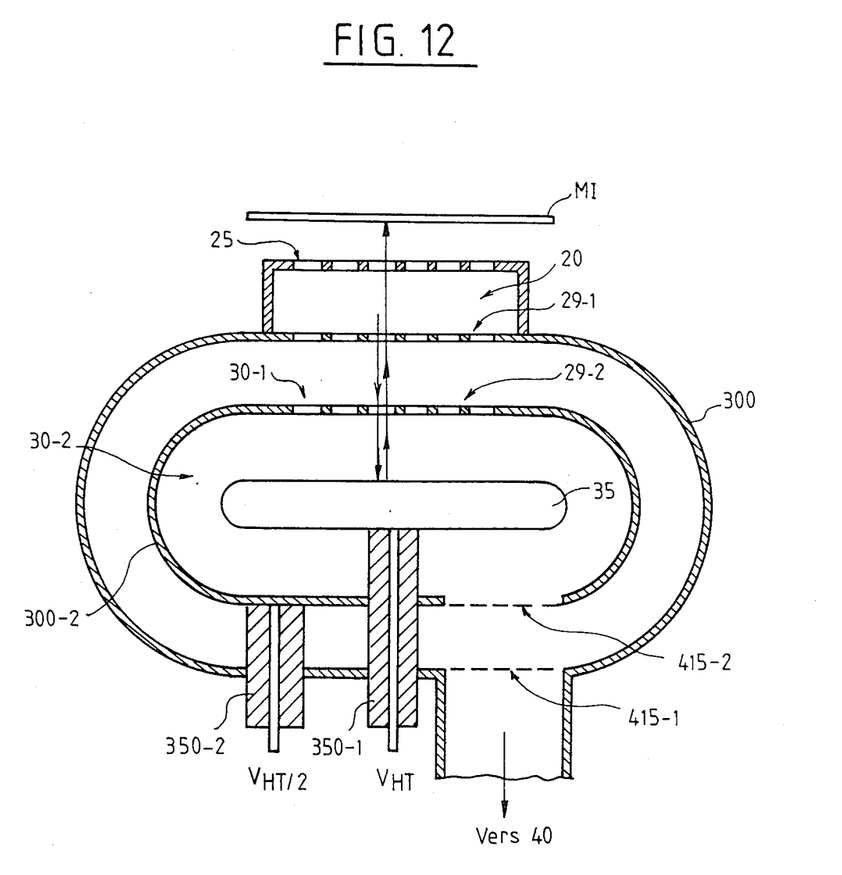
FIG. 12 is a longitudinal cross-sectional view of a second embodiment of the invention, comprising two acceleration stages in the high voltage chamber.

In FIG. 12, reference 20 designates the ionisation chamber, whilst references 30-1 and 30-2 designate two parts of the high voltage chamber. The upper portion 25 of the ionisation chamber 20 is the outlet window for the electrons opposite which the material MI to be irradiated may be located.

Below the ionisation chamber 20, there appears a first extraction grid 29-1. This grid jointly forms part of the wall of the ionisation chamber 20 and of the wall 300 of the high voltage chamber.

Whilst the ionisation chamber 20 has here a rectangular parallelepiped shape, the high voltage chamber wall 300 has a generally cylindrical shape based on two planar horizontal walls joined by semi-circles, as illustrated.

At the centre of high voltage chamber 300, the cathode 35 is located provided with an insulated duct 350-1, and receiving a negative bias voltage $V_{HT}$.

Between the external wall 300 and the cathode 35, which have similar shapes, is a partition 300-2 which is also similar to the said shapes and is provided opposite the extraction grid 29-1 with a second extraction grid or intermediate electrode referenced 29-2. This intermediate electrode is subjected to an electric power supply for example at voltage $V_{HT}/2$, available through an insulated duct 350-2, and this on the hypothesis that the partition 300-2 is substantially equidistant between the cathode 35 and the external wall 300.

On the opposite side to the extraction grids 29-1 and 29-2, the wall 300-2 has a grid 415-2 which allows helium to pass to create a vacuum in the chamber 30-2, and is situated preferably opposite the grid 415-1 of the wall 300 which allows the high voltage chamber to communicate with the pumping device 40.

The grids 29-1, 29-2 have similar shapes, namely one of the kinds previously described.

The supply voltage $V_{HT}/2$ may be obtained by means of a separate low power supply or from the supply voltage $V_{HT}$ using a resistive or capacitive divider bridge. In fact, the current to be supplied to the intermediate electrode is of low power because it corresponds to (a) the current resulting from micro flash-overs occurring between on the one hand the intermediate electrode and the casing and on the other hand the intermediate electrode and the cathode as well as (b) the possible interception of ions or electrons moving in the acceleration space through the holes of the intermediate electrode.

The twin stage arrangement of FIG. 12 allows the limit of the supply voltage to be increased. In fact, in an industrial environment, it is difficult to exceed a voltage limit of the order of 200 to 250 kilovolts between the electrodes. The breakdown of the acceleration space (the interior of the high voltage chamber) into two or several stages such as 30-1 and 30-2 by means of one or several intermediate electrodes makes it possible to resolve this problem, and to obtain at the same time a regular distribution of the total potential difference and consequently a more favourable geometry of the electric field lines. It is preferable for the passage holes arranged in the grids 29-1 and 29-2 to have small dimensions, in relation to the spacing between these grids.

By permitting an increase in the general supply voltage, the twin or multi-stage embodiments of the invention make it possible to obtain electrons with higher energy levels.

We claim:

1. An electron gun comprising:
   an ionization chamber containing a gas to be ionized at low pressure;
   a high voltage chamber adjacent to said ionization chamber;
   a casing for lodging said ionization chamber and said high voltage chamber;
   a conducting grid arranged between said ionization chamber and said high voltage chamber for permitting intercommunication thereof, said conducting grip having passage holes;
   said ionization chamber having means capable of creating positive ions of said gas, and an outlet window, transparent for electrons, facing said conducting grid, and having outlet holes,
   first biasing means for biasing said conducting grid to a potential approximately equal to that of said outlet window, said outlet window being connected to ground;
   said high voltage chamber including a cold cathode having a surface adapted to emit secondary electrons in response to impinging ions, said surface facing said conducting grid,
   second biasing means for biasing said cold cathode to a high negative voltage with respect to said conducting grid and said outlet window;
   said first and second biasing means creating an electric field having first field lines between said outlet window and said conducting grid, and having second field lines between said conducting grid and said surface of said cold cathode, said electric field accelerating, along successively said first and second field lines, said positive ions from said ionization chamber through said conducting grid to impinge onto said surface of said cold cathode, and, reciprocally, accelerating, essentially along said second field lines, secondary electrons created by the impinging ions from said cold cathode through said conducting grid and through said outlet window,
   said passage holes of the conducting grid defining a first pattern for the pattern of said accelerated ions, said surface of said cold cathode defining a second pattern for secondary electron emission in response to impinging ions having passed through said first pattern, said passage holes of the conducting grid now reconfiguring the reciprocal passage of said secondary electrons to a third pattern corresponding to those of the secondary electrons emitted with said second pattern which pass through said passage holes, and said outlet window reconfiguring the outlet of said secondary electrons to a fourth pattern corresponding to those of secondary electrons having passed reciprocally through said passage holes of said conducting grid, which pass through said outlet holes, and
   said surface of said cold cathode, said conducting grid and said outlet window being substantially planar and parallel to each other, with said second field lines having directions generally perpendicular to the respective planes of said cold cathode, said conducting grid and said outlet window, each of said passage holes of said conducting grid having a respective first normal projection on said surface of said cold cathode, and each of said outlet holes of said outlet window having a respective second normal projection on said surface of said cold cathode, each second normal projection being substantially homothetic to a respective one of said first normal projections such that said first, second, third and fourth patterns correspond closely to each other along the directions of said second field lines of said electric field.

2. An electron gun according to claim 1, wherein said respective first normal projection of each of said passage holes are superposable with said respective second normal projection of each of said outlet holes.

3. An electron gun according to claim 1, wherein each said second normal projection of each of said outlet holes is larger than the corresponding homothetic first normal projection of each of said passage holes.

4. An electron gun according to claim 1, wherein said conducting grid comprises a mask constituted by a first plate pierced by first plate holes, said first plate supporting a uniformly perforated screen.

5. An electron gun according to claim 4, wherein said first plate holes have a cross sectional surface being about half of the overall cross-section of said first plate, and said uniformly perforated screen is a woven grid.

6. An electron gun according to claim 4, wherein said first plate holes have a cross sectional surface being about half of the overall cross-section of said first plate, and said uniformly perforated screen is a metallic sheet pierced by multiple holes smaller than said first plate holes.

7. An electron gun according to claim 1, wherein said conducting grid comprises strips parallel to each other and perpendicular to said surface of said cold cathode, said strips defining spaces between each other, the cross sectional surface of said spaces covering a major portion of the overall cross sectional surface of said conducting grid, such that said conducting grid creates a focalization electric field for focusing said ions on said surface of said cold cathode, so that the trajectories of said secondary electrons, in the opposite direction, are not substantially modified by said focalization electric field.

8. An electron gun according to claim 1, wherein said conducting grid comprises a second plate pierced by second plate holes, the cross sectional surface of said second plate holes covering a major portion of the overall cross sectional surface of said second plate, such that said conducting grid creates a focalization electric field for focusing said ions on said surface of said cold cathode, so that the trajectories of said secondary electrons, in the opposite direction, are not substantially modified by said focalization electric field.

9. An electron gun according to claim 1, further comprising means opposite said outlet window for admitting a feed of a product to be treated, wherein said conducting grid has elongated openings disposed obliquely in relation to an admitting direction of said feed.

10. An electron gun according to claim 1, wherein said outlet window supports a conductive sheeet having a thickness of a few tens of micrometers.

11. An electron gun according to claim 1, further comprising a conductive sheet supported by said outlet window, wherein said outlet window includes hollow bars adapted to be traversed by a coolant fluid.

12. An electron gun according to claim 1, wherein said outlet window comprises two similar grids placed on either side of a sheet which said two similar grids support.

13. An electron gun according to claim 1, including at least one electrode between said conducting grid and said cold cathode, said at least one electrode having electrode holes defining a fifth pattern, for further reconfiguring the flow of those of the accelerated ions having passed through said first pattern, said fifth patterns being geometrically similar to said first pattern, and said at least one additional electrode further reconfiguring the flow of said secondary electrons to a sixth pattern corresponding to those of the secondary electrons emitted with said second pattern which pass through said electrode holes, said sixth pattern being geometrically similar to said third pattern, and including third biasing means for biasing said at least one electrode to a potential which is chosen to be between the potential of said conducting grid and the potential of said cold cathode.

14. An electron gun according to claim 13, wherein said at least one electrode is pierced outside its said fifth and said sixth patterns, to allow a second gas to be pumped into the interior of said high voltage chamber.

15. An electron gun according to claim 1, wherein said conducting grid and said outlet window are machined within hollow bulk members arranged for permitting circulation of a coolant fluid.

16. An electron gun comprising:
an ionization chamber containing a gas to be ionized at low pressure;
a high voltage chamber adjacent to said ionization chamber;
a casing for lodging said ionization chamber and said high voltage chamber;
a conducting grip arranged between said ionization chamber and said high voltage chamber for permitting intercommunication thereof, said conducting grid having passage holes,
said ionization chamber having means capable of creating positive ions of said gas, and an outlet window, transparent for electrons, facing said conducting grid, and having outlet holes,
said means capable of creating positive ions of said gas including an anodic filament, a secondary starting filament and electric supply means for said anodic filament, wherein said electric supply means has an elastic portion for compensation of elongation of said anodic filament;
first biasing means for biasing said conducting grid to a potential approximately equal to that of said outlet window, said outlet window being connected to ground,
said high voltage chamber comprising a cold cathode having a surface adapted to emit secondary electrons in response to impinging ions, said surface facing said conducting grid;
a pumping opening provided behind said cold cathode on the side facing away from said conducting grid;
an insulating tube supporting said cold cathode, said insulating tube having internal conduit means to receive a high voltage supply line and defining supply and return means for a coolant fluid; and
second biasing means for biasing said cold cathode to a high negative voltage with respect to said conducting grid and said outlet window,
said first and second biasing means creating an electric field having first field lines between said outlet window and said conducting grid, and having second field lines between said conducting grid and said surface of said cold cathode, said electric field accelerating, along successively said first and second field lines, said positive ions from said ionization chamber through said conducting grid to impinge onto said surface of said cold cathode, and, reciprocally, accelerating, essentially along said second field lines, secondary electrons created by the impinging ions from said cold cathode through said conducting grid and through said outlet window,
said passage holes of the conducting grid defining a first pattern for the passage of said accelerated ions, said surface of said cold cathode defining a second pattern for secondary electron emission in response to impinging ions having passed through said first pattern, said passage holes of the conducting grid now reconfiguring the reciprocal passage of said secondary electrons to a third pattern corresponding to those of the secondary electrons emitted with said second pattern which pass through said passage holes, and said oulet window reconfiguring the outlet of said secondary electrons to a fourth pattern corresponding to those of said secondary electrons having passed reciprocally through said passage holes of said conducting grid, which pass through said outlet holes,
said surface of said cold cathode, said conducting grid and said outlet window being substantially planar and parallel to each other, with said second field lines having directions generally perpendicular to the respective planes of said cold cathode, said conducting grid and said outlet window, each of said passage holes of said conducting grid having a respective first normal projection on said surface of said cold cathode, and each of said outlet holes of said outlet window having a respective second normal projection on said surface of said cold cathode, said second normal projection being substantially homothetic to a respective one of said first normal projections such that said first, second, third and fourth patterns correspond closely to each other along the directions of said second field lines of said electric field.

17. An electron gun according to claim 16, wherein said respective first normal projection of each of said passage holes are superposable with said respective second normal projection of each of said outlet holes.

18. An electron gun according to claim 16, wherein each said normal projection of each of said outlet holes is larger than the corresponding homothetic first normal projection of each of said passage holes.

19. An electron gun according to claim 16, wherein said conducting grid comprises a mask constituted by a first plate pierced by first plate holes, said first plate supporting a uniformly perforated screen.

20. An electron gun according to claim 19, wherein said first plate holes have a cross sectional surface being about half of the overall cross-section of said first plate, and said uniformly perforated screen is a woven grid.

21. An electron gun according to claim 19, wherein said first plate holes have a cross sectional surface being about half of the overall cross-section of said first plate, and said uniformly perforated screen is a metallic sheet pierced by multiple holes smaller than said first plate holes.

22. An electron gun according to claim 16, wherein said conducting grip comprises strips parallel to each other and perpendicular to said surface of said cold cathode, said strips defining spaces between each other, the cross sectional surface of said spaces covering a major portion of the overall cross sectional surface of said conducting grid, such that said conducting grid creates a focalization electric field for focusing said ions on said surface of said cold cathode, so that the trajectories of said secondary electrons, in the opposite direction, are not substantially modified by said focalization electric field.

23. An electron gun according to claim 16, wherein said conducting grid comprises a second plate pierced by second plate holes, the cross sectional surface of said second plate holes covering a major portion of the overall cross sectional surfaces of said second plate, such that said conducting grid creates a focalization electric field for focusing said ions on said surface of said cold cathode, so that the trajectories of said secondary electrons, in the opposite direction, are not substantially modified by said focalization electric field.

24. An electron gun according to claim 16, further comprising means opposite said outlet window for admitting a feed of a product to be treated, wherein said conducting grid has elongated opening disposed obliquely in relation to an admitting direction of said feed.

25. An electron gun according to claim 16, further comprising a conductive sheet having a thicknes of a few tens of micrometers, supported by said outlet window.

26. An electron gun according to claim 16, further comprising a conductive sheet supported by said outlet window, wherein said outlet window includes hollow bars adapted to be traversed by a coolant fluid.

27. An electron gun according to claim 16, wherein said outlet window comprises two similar grids placed on either side of a sheet which said two similar grids support.

28. An electron gun according to claim 16, including at least one electrode between said conducting grid and said cold cathode, said at least one electrode having electrode holes defining a fifth pattern, for further reconfiguring the flow of those of the accelerated ions having passed through said first pattern, said fifth pattern being geometrically similar to said first pattern, and said at least one electrode further reconfiguring the flow of said secondary electrons to a sixth pattern corresponding to those of the secondary electrons emitted with said second pattern which pass through said electrode holes, said sixth pattern being geometrically similar to said third pattern, and including third means for biasing said at least one electrode to a potential which is chosen to be between the potential of said conducting grid and the potential of said cold cathode.

29. An electron gun according to claim 16, wherein said at least one electrode is pierced outside its said fifth and said sixth patterns, to allow a second gas to be pumped into the interior of said high voltage chamber.

30. An electron gun according to claim 16, wherein said conducting grid and said outlet window are machined within hollow bulk members arranged for permitting circulation of a coolant fluid.

31. An electron gun comprising:
an ionization chamber containing a gas to be ionized at low pressure;
a high voltage chamber adjacent to said ionization chamber;
a casing for lodging said ionization chamber and said high voltage chamber;
a conducting grid arranged between said ionization chamber and said high voltage chamber for permitting intercommunication thereof, said conducting grid having passage holes,
said ionization chamber containing a gas chamber having means capable of creating positive ions of said gas, and an outlet window, transparent for electrons, facing said conducting grid, and having outlet holes;
first biasing means for biasing said conducting grid to a potential approximately equal to that of said outlet window, said outlet window being connected to ground,
said high voltage chamber including a cold cathode having a surface adapted to emit secondary electrons in response to impinging ions, said surface facing said conducting grid; and
second biasing means for biasing said cold cathode to a high negative voltage with respect to said conducting grid and said outlet window,
said first and second biasing means creating an electric field having field lines between said outlet window, said conducting grid and said surface of said cold cathode, said electric field accelerating said positive ions from said ionization chamber through said conducting grid to impinge onto said surface of said cold cathode, and, reciprocally, accelerating secondary electrons created by such impinging ions from said cold cathode through said conducting grid and through said outlet window,
said passage holes of the conducting grid defining a first pattern for the passage of said accelerated ions, said surface of said cold cathode defining a second pattern for secondary electron emission in response to impinging ions having passed through said first pattern, said passage holes of the conducting grid now reconfiguring the reciprocal passage of said secondary electrons to a third pattern corresponding to those of the secondary electrons emitted with said second pattern which pass through said passage holes, and said outlet window reconfiguring the outlet of said secondary electrons to a fourth pattern corresponding to those of secondary electrons having passed reciprocally through said passage holes of said conducting grid, which pass through said outlet holes, said conducting grid and said outlet window being inclined in relation to said surface of said cold cathode, said conducting grid having a first shape, and said outlet window having a second shape, said first shape and said second shape being such that said third and fourth patterns comprise substantially all the emitted secondary electrons, while certain ions having passed through a given one of the passage holes result in secondary electrons passing in one of said passage holes other than said given passage hole.

* * * * *